UNITED STATES PATENT OFFICE.

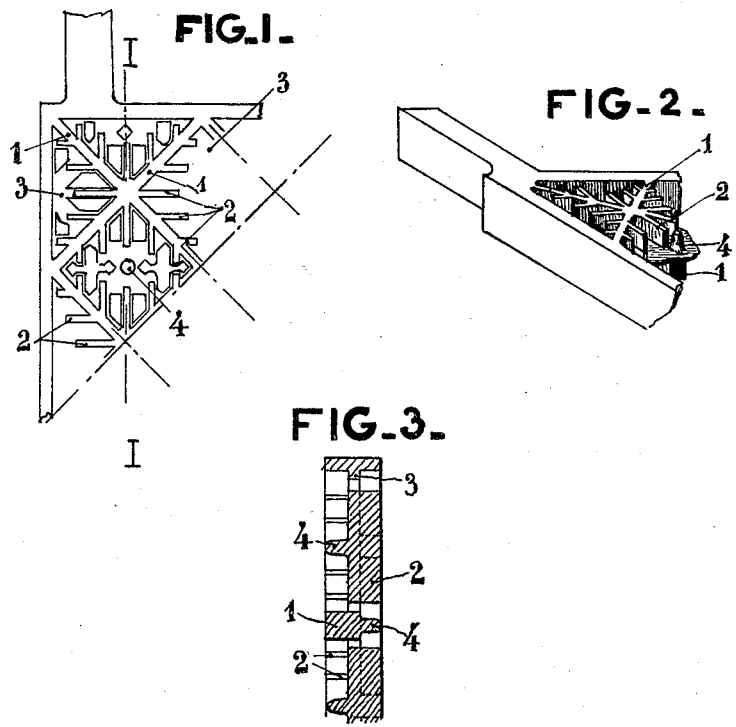

CONSTANTIN DE SEDNEFF, OF PARIS, FRANCE.

ELECTRICAL ACCUMULATOR.

1,149,558.  Specification of Letters Patent.  Patented Aug. 10, 1915.

Application filed December 20, 1913. Serial No. 807,958.

*To all whom it may concern:*

Be it known that I, CONSTANTIN DE SEDNEFF, of 2 Rue Hippolyte Lebas, Paris, France, a subject of the Emperor of Russia, have invented certain new and useful Improvements in Electrical Accumulators, of which the following is a specification.

This invention relates to accumulator electrodes of the type formed as a grid or a plate having two series of cells, the two series being on opposite sides of the plate and being so arranged that the intersection of the metal frames forming the walls of one series of cells is disposed substantially centrally to the cells of the second series.

It has been proposed in connection with an accumulator electrode in the form of a plate or grid having two series of cells, the two series being on opposite sides of the plate and being so arranged that the intersections of the metal frames forming the walls of one series of cells are disposed substantially centrally to the cells of the second series, to provide a projection extending from each point of intersection of the cell walls into the adjacent cell on the opposite side of the plate.

The object of the invention is to provide an improved electrode of the type referred to, and which in addition, has ribs projecting into the cells from the metal portion intervening between them.

According to the invention, each of the individual cells is provided with a projection extending from each point of intersection of the cell walls into the adjacent cell on the opposite side of the plate.

In order that the construction of electrodes according to the invention may be more clearly understood, reference may be had to the accompanying drawings in which:

Figure 1 is an elevation; Fig. 2 is a perspective view; and Fig. 3 is a section on the line 1—1 of Fig. 1.

The plate as illustrated comprises a series of cells formed as follows:—The webs 1 arranged parallel to the diagonals of the frame of the plate divide the plate into a plurality of cells each of these webs being provided with ribs or projections 2 extending into the space to be occupied by the active matter when the plates are pasted, other webs 3 also having metallic ribs projecting into the cells containing the active matter. Thus the plates according to the invention are formed by, in effect, superposing two grids provided with webs and ribs as described above; the one being displaced in relation to the other so as to bring the points of intersection of the webs of one series of cells opposite the centers of the cells of the other series. Projections 4 extend from the back of the grids or networks of webs forming the sides of the electrode into the corresponding cells on the opposite side of the electrode.

The plates formed according to the invention present a considerable metallic surface, are capable of securely retaining the paste and also enable each portion of the paste to receive current.

Electrodes of the forms described and of similar forms are conveniently made by casting in suitable molds.

Having now described my invention, what I claim as new and desire to secure by Letters Patent is:—

An accumulator electrode comprising a metallic plate, a plurality of cells in the plate, on one side thereof, a plurality of cells in the plate on the opposite side thereof, metallic ribs projecting into the cells from the metallic portion between the said cells, the second mentioned cells being so arranged in relation to the first mentioned cells that the points of intersection of the walls of the cells formed by the metallic portion between the one series of cells are disposed substantially centrally to the cells of the other series, and a metallic projection at each point of intersection of the metallic portion between the cells, each of said projections extending into a cell on the opposite side of the plate.

In testimony whereof I have signed my name to this specification in the presence of two subscribing witnesses.

CONSTANTIN DE SEDNEFF.

Witnesses:
HANSON C. COXE.
MIGUEL ZEROLO.

Copies of this patent may be obtained for five cents each, by addressing the "Commissioner of Patents, Washington, D. C."